Sept. 29, 1959  K. ZYSSET  2,906,195
HAND-OPERATED FRUIT AND VEGETABLE PRESS
Filed April 1, 1958  3 Sheets-Sheet 1
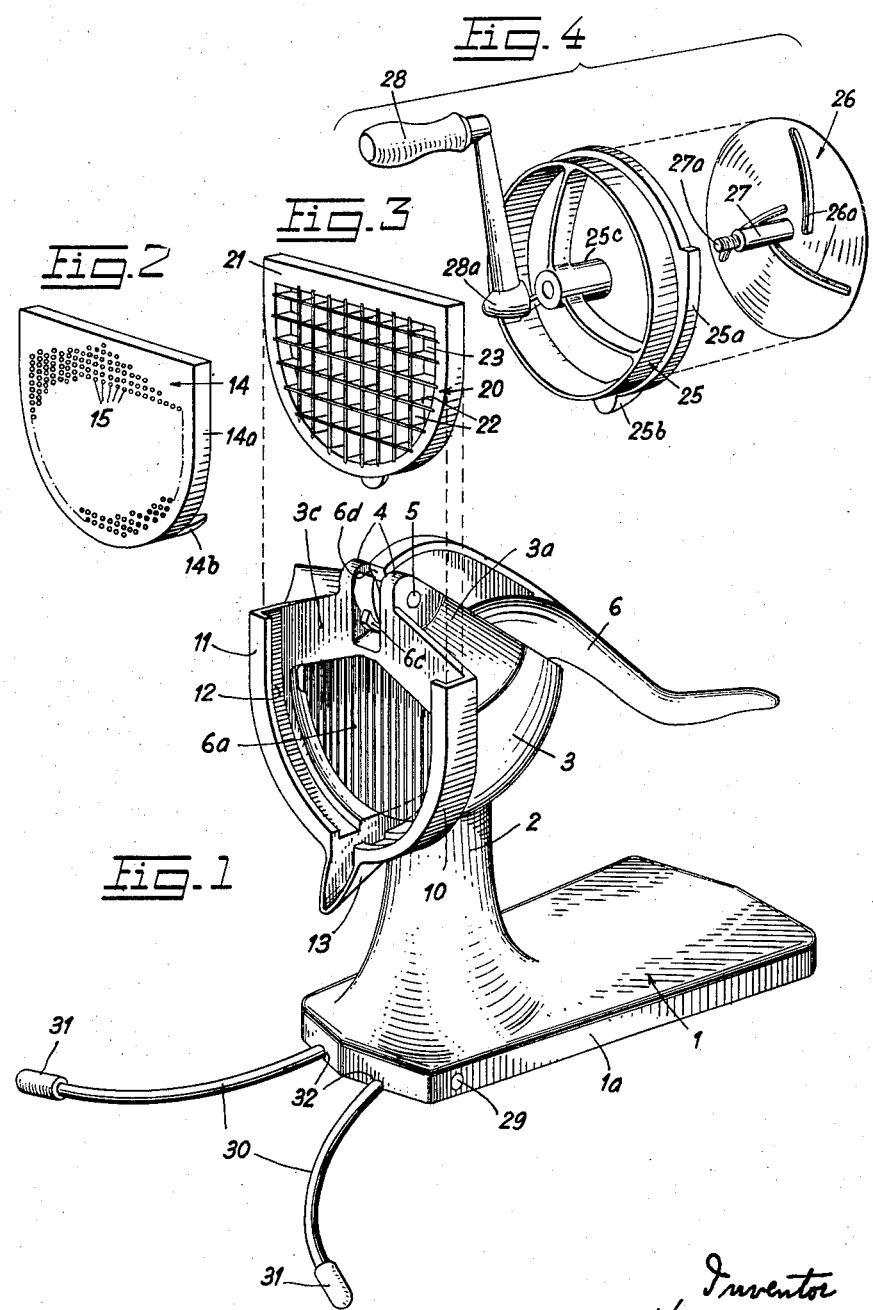

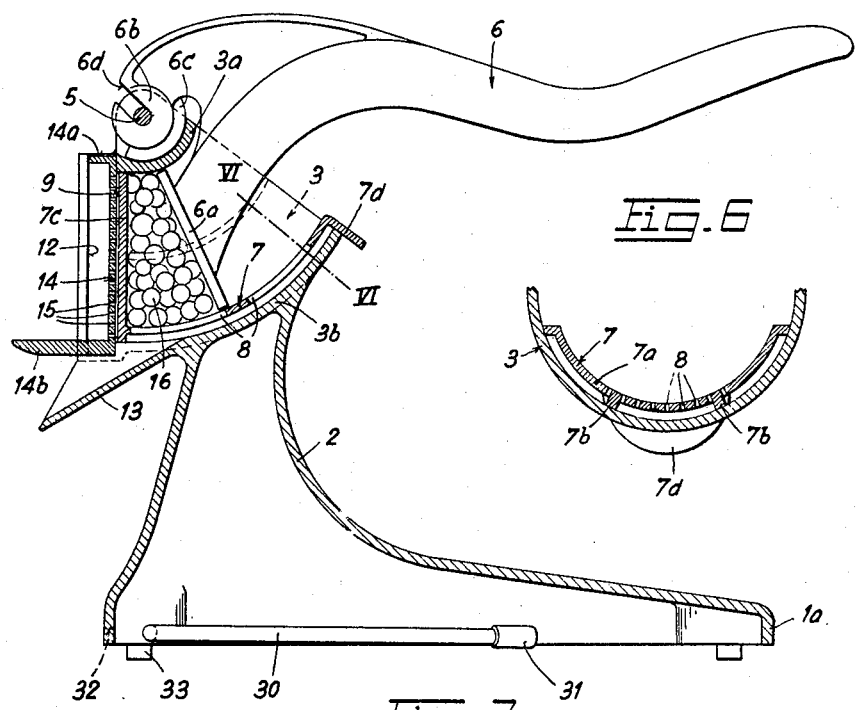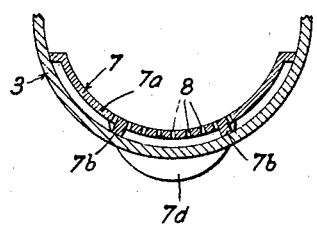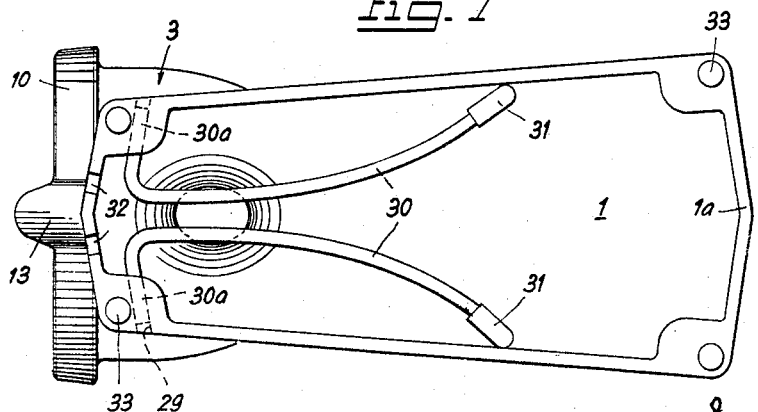

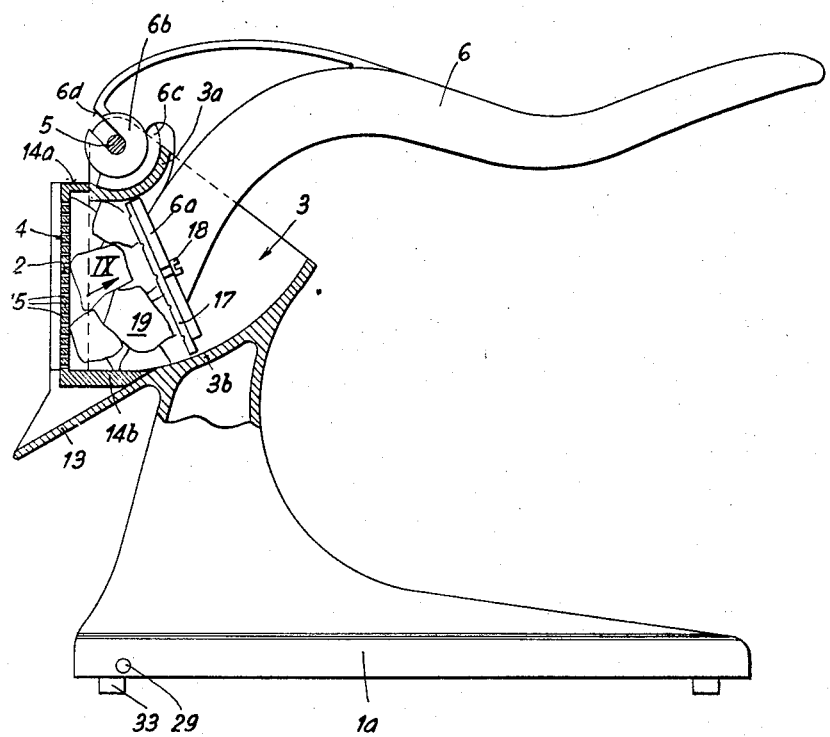
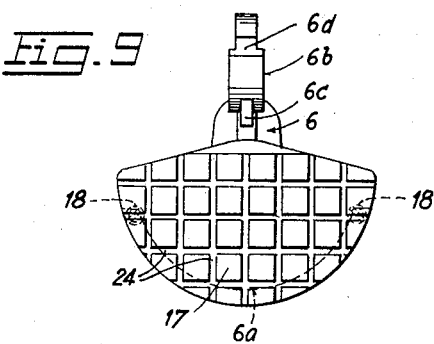

United States Patent Office 2,906,195
Patented Sept. 29, 1959

2,906,195

HAND-OPERATED FRUIT AND VEGETABLE PRESS

Karl Zysset, Lyss, Bern, Switzerland

Application April 1, 1958, Serial No. 725,560

Claims priority, application Switzerland October 7, 1957

1 Claim. (Cl. 100—125)

My present invention relates to an improved hand-operated fruit and vegetable press of the type, known per se, comprising a base, a column integral therewith, a hollow cylinder integral with the column and of which the center line extends along a circular arc, a handle pivoted to the cylinder to swing about the center of said arc, said handle having a part formed to act as a piston in said cylinder, and a strainer insertable in the cylinder for draining juice from the goods which are pressed between a closed cylinder endwall and said piston member.

Known presses of this type can only be used as juicers and have proved very efficient as such since the handle portion formed to act as a piston in moving along the strainer insert counteracts any tendency of the strainer openings of said insert to become clogged. The reason for known presses of this type only being usable as juicers, which is a considerable disadvantage, is that the closed endwall is cast integral with the cylinder shell.

The main object of the invention is to eliminate said disadvantage by forming the entire endwall as a part of the strainer insert and supporting same on a perforated plate which is insertable into a groove provided in the cylinder shell. Said plate is so insertable that when the strainer insert has been set in place, a lug projecting from the bottom edge of said plate leaves unobstructed a juice discharge groove branching from the cylinder, whereas said lug closes said groove when the strainer insert has not been set in place.

Further features and advantages of a preferred form of the invention spring from the following description thereof with reference to the drawing, in which—

Fig. 1 is a perspective view of the press, the perforated plate not having been inserted, Fig. 2 is a similar view of the perforated plate, Fig. 3 is a similar view of an insert to be used in place of the perforated plate, for example for cutting potatoes to sticks, Fig. 4 is a similar exploded view of a device insertable in place of the perforated plate and comprising a crank handle, a rotatable disc and an annular casing, Fig. 5 is an elevation, partly in section, of the press with the stainer insert in place and the perforated plate inserted for juicing, Fig. 6 is a partial cross-section on the line VI—VI of Fig. 5, Fig. 7 is a bottom view of the press, Fig. 8 is a view similar to Fig. 5, with the strainer insert removed, the perforated plate inserted in opposite-hand relation to Fig. 5, and with the piston plate mounted on the piston part of the handle, and Fig. 9 is an endview of the handle in the direction of arrow IX in Fig. 8.

The housing of the press shown suitably is made in one piece of light metal by pressure die casting, and comprises a base 1 having a circumferential edge 1a, a column 2 and a hollow cylinder of which the center line extends in a vertical plane along a circular arc. To the cylinder wall 3a closer to the center of said arc are cast two upright bearing lugs 4 into which is fixedly inserted a bearing pin 5 concentric to the cylinder center line and at right angles to the plane of said center line. A handle 6 has a part 6a which serves as a piston, and a hooklike lug 6b pivoted on pin 5; the handle thus being swingable about the center of the arc-shaped center line of cylinder 3. When the handle part 6a is in the cylinder, lug 6b through a rib 6c cast on its back also bears on the cylinder shell portion 3a. When, however, handle 6 is swung high out of its operating range, it may be unhooked and removed thanks to the hook slot 6d of lug 6b.

The press comprises a strainer insert 7 which suitably is made of light metal or plastic by pressure die casting. A part 7a of insert 7 is adapted to the form of the concave cylinder shell part 3b both in longitudinal section (Fig. 5) and in cross-section (Fig. 6) and has several rows of adjacent longitudinally extending strainer slots 8 and, on its concave exterior side, ribs 7b through which it is supported on the cylinder shell portion 3b. Insert part 7a comprises at one end a lug 7d bent outwardly at right angles and, at the other end, a flat insert part 7c at right angles. When the strainer insert has been inserted into cylinder 3 and the ribs 7b bear on the cylinder inside, the part 7c forms the entire cylinder front endwall which on both sides is provided with grooves 9, as shown in Figure 5, the grooves 9 being similar to the vertical grooves provided in the part 6a, which is shown in Figure 1. The outwardly facing exterior face of the part 7c is flush with the vertical front endface 3c of cylinder 3. To the front of cylinder 3 is cast a part 10 which, seen from the left in Fig. 1, is U-shaped and comprises a radially inwardly projecting flange 11 to form a groove 12 of which the rear lateral face is formed by the front endface 3c of cylinder 3. Integral with said part 10 and the forward end of the cylinder shell portion 3b is a juice discharge spout 13.

To the press further belongs a piston-mounting plate 17 (Figs. 8 and 9) which is provided with two lateral head screws 18 by means of which the plate is mounted on the piston part 6a of handle 6. When the strainer insert 7 has been removed from the press, said plate 17 closes the gap between the lower edge of handle part 6a and the cylinder shell portion 3b. In the position of use shown in Fig. 8, the perforated plate 14 has been inserted turned through 180° with respect to its position shown in Fig. 5, so that lug 14b closes the mouth of spout 13. The press then may be used, for example, for extruding soft-boiled potatoe cubes 19 through the fine holes 15 of perforated plate 14.

To the press further belongs a cutting insert 20 (Fig. 3) which may be inserted into groove 12 in place of the perforated plate 14 having a circumferential rim 14a and which comprises a cast frame 21 and a plurality of knives 22 of which the ends are cast in the frame and which cross each other, leaving square openings 23 between them. Said knives are notched at their points of intersection to a depth equal to half the knife-width. When using this cutting insert in place of the perforated plate, raw potatoes or the like may be cut to sticks of square cross-section. On the front face of plate 17 are disposed intercrossing grooves 24 in the same pattern as the knives 22 in frame 21, so that the plate front face is movable somewhat in the plane in which lie the knife edges.

A further attachment for use with the press is a cutter as shown in Fig. 4 and comprising an annular casing 25 which thanks to an external flange 25a may be inserted into groove 12 in place of the perforated plate 14 when the strainer insert 7 has been removed, and which has a lug 25b for closing the mouth of the juice spout 13, similar to lug 14b of the perforated plate 14 (Fig. 2). To this cutting attachment belongs further at least one cutting disc 26 to which is fixed a shaft 27 for rotation in a central bearing 25c of casing 25. The free end portion of shaft 27 is threaded at 27a for being engaged in the boss 28a of a crank handle 28. As in the case of similar household apparatus, this cutting device obviously is demountable, and the cutting disc 26 together with shaft 27 is exchangeable for another in which the knives 26a are differently arranged.

When using this cutting attachment shown in Fig. 4, alternatively the strainer insert 7 or the handle 6 may be employed for feeding the goods to be shredded or chopped.

The base 1 would provide insufficient stability for use of the press together with the cutting attachment shown in Fig. 4. For this reason, the forward ends of the lateral portions of rim 1a are slightly thickened and provided with bores 29 inclined with respect to the longitudinal center line of the press. In each bore 29 is rotatably mounted the end 30a of a bent rod 30, which end is bent through more than 90°, and the free ends of the rods 30 carry a rubber cap 31. Said rods may be swung alternatively inwardly into the hollow space of base 1, as shown in Figs. 5 and 7, or outwardly into the position shown in Fig. 1 in which they extend through notches 32 (Figs. 5 and 7) of the front rim portion and thereby substantially improve the stability, particularly also in a lateral sense. Into bores of rim 1a are set small rubber feet 33.

What I claim as new and desire to secure by Letters Patent, is:

In a fruit and vegetable press of the type comprising a base, a column integral therewith, a hollow compression chamber carried by the column and of which the center line extends along a circular arc, a handle pivoted to the chamber to swing about the center of said arc, said handle having a part formed to act as a piston in said chamber, and a strainer adapted to be inserted within said chamber to strain juice expressed from goods pressed and crushed between a closed endwall of the chamber and said piston part; the improvement defined by the fact that the entire endwall is formed as part of the strainer insert and bears against a perforated plate adapted to be inserted in a groove of the chamber wall so that, when the strainer insert has been set in place, a lug projecting from the lower rim of said plate does not abstract a juice discharge spout branching from said chamber and, when said insert has been withdrawn and said plate turned through 180° and set in place, said lug obstructs said spout.

References Cited in the file of this patent

UNITED STATES PATENTS

| | | |
|---|---|---|
| 637,521 | Mitchell | Nov. 21, 1899 |
| 1,910,559 | Morin | May 23, 1933 |
| 1,995,260 | Flint | Mar. 19, 1935 |
| 2,111,997 | Stephens | Mar. 22, 1938 |
| 2,228,175 | Miller | Jan. 7, 1941 |

FOREIGN PATENTS

| | | |
|---|---|---|
| 249,593 | Switzerland | May 1, 1948 |
| 409,503 | Great Britain | May 3, 1934 |
| 425,895 | Italy | Oct. 15, 1947 |
| 544,478 | France | June 22, 1922 |
| 1,084,760 | France | July 13, 1954 |
| 1,095,782 | France | Dec. 22, 1954 |